(12) United States Patent
Yang et al.

(10) Patent No.: US 11,330,529 B2
(45) Date of Patent: May 10, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 154 days.

(21) Appl. No.: 16/652,785

(22) PCT Filed: Oct. 12, 2017

(86) PCT No.: PCT/CN2017/105957
§ 371 (c)(1),
(2) Date: Apr. 1, 2020

(87) PCT Pub. No.: WO2019/071544
PCT Pub. Date: Apr. 18, 2019

(65) Prior Publication Data
US 2020/0245256 A1  Jul. 30, 2020

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/243* (2013.01); *H04W 52/367* (2013.01); *H04W 80/02* (2013.01)

(58) Field of Classification Search
CPC ............. H04W 52/146; H04W 52/243; H04W 52/367; H04W 80/02; H04W 52/16; H04W 52/36
See application file for complete search history.

(56) References Cited

U.S. PATENT DOCUMENTS

| | | | |
|---|---|---|---|
| 2009/0196192 A1* | 8/2009 | Lim | H04W 52/247 370/252 |
| 2010/0103867 A1* | 4/2010 | Kishiyama | H04W 52/16 370/320 |

(Continued)

FOREIGN PATENT DOCUMENTS

| | | |
|---|---|---|
| CN | 101399578 A | 4/2009 |
| CN | 103298096 A | 9/2013 |

(Continued)

OTHER PUBLICATIONS

"Transmission Power Control Techniques for MAC Protocols in Wireless Sensor Networks"; Correia et al.; NOMS 2008-2008 IEEE Network Operations and Management Symposium; Apr. 7, 2008 (Year: 2008).*

(Continued)

*Primary Examiner* — Benjamin H Elliott, IV
(74) *Attorney, Agent, or Firm* — Young Basile Hanlon & MacFarlane, P.C.

(57) ABSTRACT

Provided are a data transmission method, a terminal device, and a network device. The method may include: a terminal device receives a first offset value sent by a network device; the terminal device determines, according to the first offset value, a first transmission power of uplink data of the terminal device, the first transmission power being less than or equal to a second transmission power, the second transmission power being determined by the terminal device according to the anti-interference ability thereof; and the (Continued)

terminal device sends the uplink data to the network device according to the first transmission power.

13 Claims, 2 Drawing Sheets

(51) Int. Cl.
*H04W 52/36* (2009.01)
*H04W 80/02* (2009.01)

(56) References Cited

U.S. PATENT DOCUMENTS

| | | | |
|---|---|---|---|
| 2013/0044621 A1* | 2/2013 | Jung | H04L 5/0007 370/252 |
| 2014/0094214 A1* | 4/2014 | Meyer | H04W 52/46 455/522 |
| 2014/0177601 A1* | 6/2014 | Nishio | H04W 76/27 370/332 |
| 2015/0005028 A1* | 1/2015 | Yang | H04W 24/08 455/522 |
| 2015/0117407 A1* | 4/2015 | Hogan | H04W 52/12 370/331 |
| 2016/0212712 A1* | 7/2016 | Chen | H04W 52/146 |
| 2017/0078971 A1* | 3/2017 | Noh | H04L 5/14 |
| 2017/0208554 A1* | 7/2017 | Hoshino | H04W 52/247 |
| 2018/0175997 A1* | 6/2018 | Liu | H04L 5/14 |
| 2019/0357149 A1* | 11/2019 | Zhang | H04W 72/14 |
| 2020/0112925 A1* | 4/2020 | Ji | H04W 52/10 |
| 2020/0245256 A1* | 7/2020 | Yang | H04W 52/146 |

FOREIGN PATENT DOCUMENTS

| | | |
|---|---|---|
| CN | 104519561 A | 4/2015 |
| CN | 106576303 A | 4/2017 |
| EP | 2819473 A1 | 12/2014 |
| WO | 2014079014 A1 | 5/2014 |
| WO | WO-2014079014 A1 * | 5/2014 ............ H04W 52/16 |

OTHER PUBLICATIONS

"Theoretical Analysis of Full-Duplex System with Power Control"; 2016 International Symposium on Wireless Communication Systems (ISWCS); Sep. 20, 2016 (Year: 2016).*
"Adaptive Multi-Channel Transmission Power Control for Industrial Wireless Instrumentation"; IEEE Transactions on Industrial Informatics, vol. 10, No. 2, May 2014 (Year: 2014).*
Communication pursuant to Article 94(3) EPC for EP Application 17928226.4 dated Feb. 25, 2021. (9 pages).
Communication pursuant to Article 94(3) for EP Application 17928226.4 dated Apr. 22, 2021. (6 pages).
Extended European Search Report for EP Application 17928226.4 dated Jul. 6, 2020.
3GPP TSG-RAN WG2 NR Adhoc #2; Qingdao, China, Jun. 27-29, 2017; R2-1706596.
Indian examination Report for IN Application 202017018865 dated Jun. 2, 2021. (6 pages).

* cited by examiner

DATA TRANSMISSION METHOD, TERMINAL DEVICE, AND NETWORK DEVICE

CROSS-REFERENCE TO RELATED APPLICATION(S)

This application is a 371 application of International Application No. PCT/CN2017/105957, filed on Oct. 12, 2017, the entire disclosure of which is hereby incorporated by reference.

TECHNICAL FIELD

Implementations of the present disclosure relate to a field of communication, and more particularly, relate to a method for transmitting data, a terminal device and a network device.

BACKGROUND

With people's pursuit of speed, delay, high-speed mobility, energy efficiency and a diversity and complexity of business in a future life, the 3rd generation partnership project (3GPP) International Standards Organization begins to research and develop the fifth generation mobile communication technology (5-Generation, 5G). Main application scenarios of 5G are: Enhance Mobile Broadband (eMBB), Ultra-Reliable and Low Latency Communication (URLLC), Mass Machine Type of Communication (mMTC).

When New Radio (NR) is in an early deployment, a full NR coverage is difficult to obtain, so a typical network coverage is a Long Term Evolution (LTE) coverage over a wide area and an island coverage mode of NR. Moreover, as a large amount of LTE is deployed below 6 GHz, there are few spectrums below 6 GHz that may be used for 5G. Therefore, NR must study a spectrum application above 6 GHz, while in a high band, the coverage is limited and the signal fading is fast. In the prior art, a working mode of tight interworking between LTE and NR is proposed so as to protect previous investments in LTE of mobile operators. Specifically, LTE-NR Dual Connection (DC) data transmission is supported by a band combination to improve a system throughput.

However, when a terminal device simultaneously works on two or more carriers in different frequency bands, uplink signals of these carriers may interfere with downlink received signals of some carriers, thus reducing a success rate of data transmission.

SUMMARY

A method for transmitting data, a terminal device and a network device are provided.

In a first aspect, a method for transmitting data is provided, including:

receiving, by a terminal device, a first offset value sent by a network device;

determining, by the terminal device, a first transmission power of uplink data of the terminal device according to the first offset value, wherein the first transmission power is less than or equal to a second transmission power, and the second transmission power is a transmission power determined by the terminal device according to an anti-interference ability of the terminal device; and transmitting, by the terminal device, the uplink data to the network device according to the first transmission power.

In some possible implementation modes, the first offset value is a power offset value determined by the network device according to a second offset value, the second offset value is an offset value between the second transmission power and a third transmission power, and the third transmission power is a current transmission power of the terminal device.

In some possible implementation modes, before the terminal device receives the first offset value sent by the network device, the method further includes:

sending, by the terminal device, the second offset value to the network device.

In some possible implementation modes, the second offset value is carried on a media access control (MAC) control element (CE).

In some possible implementation modes, sending, by the terminal device, the second offset value to the network device, includes:

sending, by the terminal device, the second offset value to the network device periodically; or, sending, by the terminal device, the second offset value to the network device only once; or, sending, by the terminal device, the second offset value to the network device, when the terminal device determines that a reporting condition is satisfied, wherein, the reporting condition is used for triggering the terminal device to send the second offset value to the network device.

In some possible implementation modes, sending, by the terminal device, the second offset value to the network device when the terminal device determines that the reporting condition is satisfied, includes:

sending, by the terminal device, the second offset value to the network device when the second offset value is greater than or equal to a reporting threshold.

In some possible implementation modes, the first offset value is a power offset value determined by the network device according to a third offset value, the third offset value is sent by the terminal device to the network device, the third offset value is an offset value between a third transmission power and a fourth transmission power, the third transmission power is a current transmission power of the terminal device, and the fourth transmission power is a maximum transmission power capable of being supported by the terminal device.

In some possible implementation modes, determining, by the terminal device, the first transmission power of uplink data of the terminal device according to the first offset value includes:

determining, by the terminal device, a fifth transmission power according to the first offset value and the third transmission power; and determining, by the terminal device, the first transmission power by comparing the second transmission power with the fifth transmission power.

In some possible implementation modes, determining, by the terminal device, the first transmission power by comparing the second transmission power with the fifth transmission power includes:

determining, by the terminal device, the fifth transmission power as the first transmission power when the fifth transmission power is less than the second transmission power; or, determining, by the terminal device, the second transmission power as the first transmission power when the fifth transmission power is greater than or equal to the second transmission power.

In some possible implementation modes, before the terminal device receives the first offset value sent by the network device, the method further includes:

sending, by the terminal device, an early warning indication to the network device, wherein the early warning indication is used for providing an early warning of an offset degree between the second transmission power and a third transmission power to the network device, and the third transmission power is a current transmission power of the terminal device.

In some possible implementation modes, sending, by the terminal device, the early warning indication to the network device, includes:

sending, by the terminal device, the early warning indication to the network device when the terminal device determines that an offset value between the second transmission power and the third transmission power is less than or equal to the reporting threshold.

In some possible implementation modes, before the terminal device receives the first offset value sent by the network device, the method further includes:

determining, by the terminal device, the second transmission power according to the anti-interference ability of the terminal device.

In a second aspect, a method for transmitting data is provided, including:

determining, by a network device, a first offset value;

sending, by the network device, the first offset value to a terminal device to enable the terminal device to determine a first transmission power of uplink data of the terminal device according to the first offset value, wherein the first transmission power is less than or equal to a second transmission power, and the second transmission power is a transmission power determined by the terminal device according to an anti-interference ability of the terminal device.

In some possible implementation modes, before the network device determines the first offset value, the method includes:

receiving, by the network device, a second offset value sent by the terminal device, wherein the second offset value is an offset value between the second transmission power and a third transmission power, and the third transmission power is a current transmission power of the terminal device; wherein determining, by the network device, the first offset value, includes: determining, by the network device, the first offset value according to the second offset value.

In some possible implementation modes, the second offset value is carried on a media access control (MAC) control element (CE).

In some possible implementation modes, receiving, by the network device, the second offset value sent by the terminal device, includes:

receiving, by the network device, the second offset value sent by the terminal device periodically; or, receiving, by the network device, the second offset value sent by the terminal device only once.

In some possible implementation modes, before the network device determines the first offset value, the method includes:

receiving, by the network device, a third offset value sent by the terminal device, wherein the third offset value is an offset value between the third transmission power and a fourth transmission power, the third transmission power is a current transmission power of the terminal device, and the fourth transmission power is a maximum transmission power capable of being supported by the terminal device; wherein determining, by the network device, the first offset value, includes: determining, by the network device, the first offset value according to the third offset value.

In some possible implementation modes, before the network device determines the first offset value, the method includes:

receiving, by the network device, an early warning indication sent by the terminal device, wherein the early warning indication is used for providing an early warning of an offset degree between the second transmission power and a third transmission power to the network device, and the third transmission power is a current transmission power of the terminal device.

In a third aspect, a terminal device is provided, including, a transceiving unit, configured to receive a first offset value sent by a network device; and a processing unit, configured to determine a first transmission power of uplink data of the terminal device according to the first offset value, wherein the first transmission power is less than or equal to a second transmission power, and the second transmission power is a transmission power determined by the terminal device according to an anti-interference ability of the terminal device;

the transceiving unit is further configured to transmit the uplink data to the network device according to the first transmission power.

In a fourth aspect, a terminal device is provided, including:

a transceiver, configured to receive a first offset value sent by a network device; and a processor, configured to determine a first transmission power of uplink data of the terminal device according to the first offset value, wherein the first transmission power is less than or equal to a second transmission power, and the second transmission power is a transmission power determined by the terminal device according to an anti-interference ability of the terminal device;

the transceiver is further configured to transmit the uplink data to the network device according to the first transmission power.

In a fifth aspect, a network device is provided, including:

a processing unit, configured to determine a first offset value; and a transceiving unit, configured to send the first offset value to a terminal device to enable the terminal device to determine a first transmission power of uplink data of the terminal device according to the first offset value, wherein the first transmission power is less than or equal to a second transmission power, and the second transmission power is a transmission power determined by the terminal device according to an anti-interference ability of the terminal device.

In a sixth aspect, a network device is provided, including:

a processor, configured to determine a first offset value; and a transceiver, configured to send the first offset value to a terminal device to enable the terminal device to determine a first transmission power of uplink data of the terminal device according to the first offset value, wherein the first transmission power is less than or equal to a second transmission power, and the second transmission power is a transmission power determined by the terminal device according to an anti-interference ability of the terminal device.

In a seventh aspect, a computer readable medium is provided for storing a computer program. The computer program includes instructions used for executing the method implementations of the above first aspect or the second aspect.

In an eighth aspect, a computer chip is provided. The computer chip includes an input interface, an output interface, at least one processor, and a memory. The processor is used for executing codes in the memory. When the codes are executed, the processor may implement various processes performed by the terminal device in the method for transmitting data in the above first aspect and various implementation modes thereof.

In a ninth aspect, a computer chip is provided. The computer chip includes an input interface, an output interface, at least one processor and a memory. The processor is used for executing codes in the memory. When the codes are executed, the processor may implement various processes performed by the network device in the method for transmitting data in the above second aspect and various implementation modes thereof.

In a tenth aspect, a communication system is provided, including the above network device and the above terminal device.

DETAILED DESCRIPTION

Figure 1:
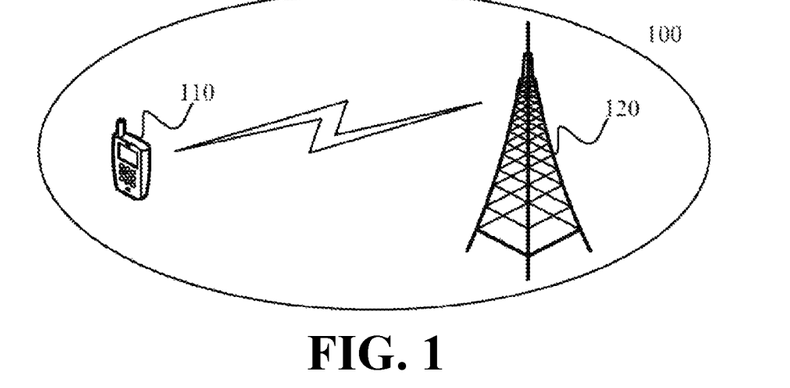
FIG. 1 is a diagram of an example of a communication system according to an implementation of the present disclosure.

FIG. 1 is a schematic diagram of an application scenario according to an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the communication system 100 is only an example for describing an implementation of the present disclosure. However, implementations of the present disclosure are not limited to this. That is, technical solutions of implementations of the present disclosure may be applied to various communication systems, such as a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, a LTE Time Division Duplex (TDD), a Universal Mobile Telecommunication System (UMTS).

In addition, in the present disclosure, various implementations are described in connection with a network device and a terminal device.

The network device 120 may refer to any entity on a network side for sending or receiving signals. For example, it may be a user equipment of Machine Type Communication (MTC), a Base Transceiver Station (BTS) in GSM or CDMA, a NodeB in WCDMA, an Evolution Node B (eNB or NodeB) in LTE, a base station device in a 5G network, etc.

The terminal device 110 may be any terminal device. Specifically, the terminal device 110 may communicate with one or more core networks through a radio access network (RAN), and may also be referred to as an access terminal, a User Equipment (UE), a subscriber unit, a subscriber station, a mobile station, a rover station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, an onboard device, a wearable device, a terminal device in a 5G network or the like.

In a 5G communication system, when New Radio (NR) is in an early deployment, a full NR coverage is difficult to obtain, so a typical network coverage is a Long Term Evolution (LTE) coverage over a wide area and an island coverage mode of NR. Moreover, as a large amount of LTE is deployed below 6 GHz, there are few spectrums below 6 GHz that may be used for 5G. Therefore, NR must study a spectrum application above 6 GHz, while in a high band, the coverage is limited and the signal fading is fast. Specifically, LTE-NR Dual Connection (DC) data transmission is supported by a band combination to improve a system throughput. However, when a terminal device simultaneously works on two or more carriers in different frequency bands, uplink signals of these carriers may interfere with downlink received signals of some carriers, thus reducing a success rate of data transmission.

However, an estimation for the severity of the self-interference (MSD) is based on an assumption of 23 dbm (a terminal maximum transmission power). When a terminal device does not work at a maximum transmission power, a corresponding self-interference will be reduced correspondingly (under the assumption of the same bandwidth), so decreasing a transmission power of a party which generates interferences may alleviate an interference degree to a certain extent.

Therefore, an implementation of the present disclosure provides a method for transmitting data, which may effectively improve a success rate of data transmission by controlling an uplink transmission power of a terminal device.

Figure 2:
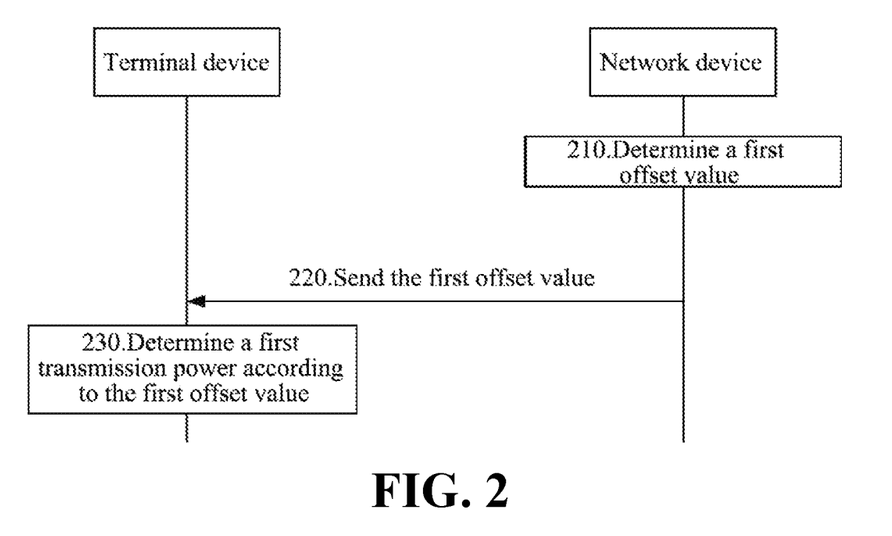
FIG. 2 is a schematic flowchart of a method for transmitting data according to an implementation of the present disclosure.

FIG. 2 is a schematic flowchart of a method for transmitting data according to an implementation of the present disclosure.

As shown in FIG. 2, the method includes acts 210-230.

In 210, a network device determines a first offset value.

In 220, the network device sends the first offset value to a terminal device.

In 230, the terminal device determines a first transmission power according to the first offset value.

Specifically, a terminal device receives a first offset value sent by a network device. The terminal device determines a first transmission power of uplink data of the terminal device according to the first offset value, the first transmission power is less than or equal to a second transmission power, and the second transmission power is a transmission power determined by the terminal device according to an anti-interference ability of the terminal device. The terminal device transmits the uplink data to the network device according to the first transmission power.

It may be seen that multiple transmission powers are involved in an implementation of the present disclosure. For convenience of understanding, the transmission powers involved in the implementation of the present disclosure will be described below.

A first transmission power: a transmission power determined by a terminal device for transmitting the uplink data. That is, the first transmission power is a transmission power which needs to be determined before the terminal device transmits the uplink data.

A fourth transmission power: it refers to a maximum transmission power which may be supported by the terminal device.

A second transmission power: it may be any transmission power less than the fourth transmission power. Optionally, the terminal device may determine a limited maximum transmission power (i.e., a second transmission power) according to the anti-interference ability of the terminal device, the limited maximum transmission power is less than the maximum transmission power (i.e., the fourth transmission power) which may be supported by the terminal device. It should be understood that the anti-interference ability of the terminal device may be a transmission power determined by the terminal device according to an internal interference level of the terminal device. In other words, the terminal device transmits the uplink data at a transmission power below the limited maximum transmission power, and the level of the interference with a receiving end may be reduced to a level tolerable by the receiving end. In other words, when the terminal device transmits and receives data at the same time, the transmission power should be below the limited maximum transmission power, thus ensuring that the terminal device may correctly demodulate received data.

A third transmit power: it refers to a current transmission power (an actual transmission power) when the terminal device transmits data. In an implementation, the third transmission power is the first transmission power. In other words, the third transmission power intended to be used before the terminal device transmits the uplink data may be a transmission power used for transmitting data by the terminal device.

In order to facilitate the understanding of the solution, the following will briefly explain the way by which the network device controls an uplink power of the terminal device in combination with the above several transmission powers.

In actual products, the terminal device may determine the above-mentioned first transmission power, second transmission power, third transmission power and fourth transmission power. However, the network device does not know the above-mentioned transmission powers. Therefore, when the network device controls the uplink power of the terminal device, it needs some interactive information for controlling.

Specifically, the terminal device sends an offset value to the network device, the offset value is an offset value between the third transmission power and the fourth transmission power. After receiving this offset value, the network device may know an adjustment range of the third transmission power, thereby further determining an adjustment amount according to channel state information and data demodulation condition. Then, the network device sends the adjustment amount to the terminal device so that the terminal device adjusts the third transmission power to further determine the first transmission power. Finally, the terminal device transmits the uplink data by the first transmission power.

An implementation mode of the terminal device determining the first transmission power according to the first offset value will be described below in combination with an uplink power control mode of the network device.

In an implementation, the first offset value may be a power offset value determined by the network device according to a second offset value, the second offset value is an offset value between the second transmission power and the third transmission power, and the third transmission power is a current transmission power of the terminal device. Optionally, the terminal device needs to send the second offset value to the network device before receiving the first offset value sent by the network device.

Optionally, the second offset value may be carried on a media access control (MAC) control element (CE).

Optionally, the terminal device may periodically send the second offset value to the network device. Specifically, the terminal device may report an offset value of the limited maximum transmission power according to a certain period. When the network device receives a new offset value of the limited maximum transmission power, the offset value of the previous limited maximum transmission power is discarded.

It should be understood that the way for sending the second offset value is only an example description, which is not specifically restricted in implementations of the present disclosure.

For example, the terminal device may send the second offset value to the network device only once.

For another example, the terminal device may send the second offset value to the network device when it is determined that the reporting condition is satisfied, and the reporting condition is used for triggering the terminal device to send the second offset value to the network device. Further, when the second offset value is greater than or equal to a reporting threshold, the terminal device sends the second offset value to the network device. In other words, if the current transmission power (the third transmission power) of a certain uplink is PC1_max and the actual transmission power (the second transmission power) which may be supported by the terminal is PC2, then when PC1_max-PC2>the reporting threshold, the terminal is triggered to report to the network.

For example, the second offset value may be carried in some existing messages or may be transmitted separately.

It should be understood that in an implementation of the present disclosure, if the uplink transmission power of the terminal device exceeds the second transmission power due to scheduling information and path loss (PL), the terminal device still transmits the uplink data according to the second transmission power.

In another implementation, the first offset value is a power offset value determined by the network device according to a third offset value, the third offset value is sent by the terminal device to the network device, the third offset value is an offset value between a third transmission power and a fourth transmission power, the third transmission power is an actual transmission power of the terminal device, and the fourth transmission power is the maximum transmission power which may be supported by the terminal device.

In an implementation of the present disclosure, the third offset value sent by the terminal device to the network device is an offset value between the actual transmission power and the maximum transmission power which may be supported by the terminal device, therefore, in order to ensure the success rate of data transmission, that is, to ensure that the first transmission power is less than or equal to the second transmission power, the terminal device needs to determine the first transmission power in combination with the second transmission power and the third offset value.

Specifically, the terminal device may firstly determine a fifth transmission power according to the first offset value and the third transmission power; then, the terminal device determines the first transmission power by comparing the second transmission power with the fifth transmission power.

For example, when the fifth transmission power is less than the second transmission power, the terminal device determines the fifth transmission power as the first transmission power.

Specifically, when the uplink transmission power of the terminal device plus a power adjustment value in an uplink transmission power control (TPC) command sent by the network device is less than the limited maximum transmission power of the terminal device, the terminal device executes the uplink transmission power control command according to the prior art and adjusts the uplink transmission power according to TPC, and transmits the uplink data according to the latest power.

For example, when the fifth transmission power is greater than or equal to the second transmission power, the terminal device determines the second transmission power as the first transmission power.

Specifically, when the uplink transmission power of the terminal device plus the power adjustment value in TPC is greater than or equal to the limited maximum transmission power of the terminal device, the terminal device transmits the uplink data according to the limited maximum transmission power of the terminal device.

It should be understood that in an implementation of the present disclosure, when the terminal device is already in a state of transmitting the uplink data at the limited maximum transmission power, a TPC command from the network device is received. If the TPC command is for lowering the uplink transmission power of the terminal device, then the terminal device adjusts the uplink transmission power according to the TPC and transmits the uplink data according to the latest power. When the terminal device is already in a state of transmitting the uplink data at the limited maximum transmission power, a TPC command from the network device is received. If the TPC command is for increasing the uplink transmission power of the terminal device, the TPC command from the network device is ignored, and the uplink data is still transmitted according to the limited maximum transmission power of the terminal device. Optionally, the terminal device indicates to the network device that the terminal device invalidates the TPC indication. After receiving the indication, the network device does not send the TPC command of increasing the uplink transmission power of the terminal device temporarily. A low-order modulation and coding strategy (MCS) is adopted when the terminal device is scheduled.

It should also be understood that in an implementation of the present disclosure, if the uplink transmission power of the terminal device exceeds the second transmission power due to the scheduling information and the path loss (PL), the terminal device still transmits the uplink data according to the second transmission power.

In another implementation, the terminal device may send an early warning indication to the network device before the first offset value sent by the network device is received, the early warning indication is used for providing an early warning of an offset degree between the second transmission power and the third transmission power to the network device, and the third transmission power is a current transmission power of the terminal device.

Specifically, in order to make the network device know a degree of approaching a power limited state by the terminal device, the terminal device sends an indication to the network device to warn that the power limited state is coming. Therefore, when the actual transmission power is relatively close to the limited transmission power of the terminal device, the terminal device warns the network proactively, thus preventing the terminal device from discarding a TPC command frequently after the threshold is exceeded.

For example, the terminal device may send the warning indication to the network device when it is determined that an offset value between the second transmission power and the third transmission power is less than or equal to the reporting threshold.

In other words, when the second transmission power ($PC3\_max$)—the third transmission power ($P\_Tx$)<a threshold Y, the terminal is triggered to report to the network, and Y is a threshold.

It should be understood that a purpose of implementations of the present disclosure is to control the transmission power of the terminal device for transmitting uplink data to be less than or equal to the second transmission power in an implementation of the present disclosure. Therefore, that is, the above implementations are merely example implementations of the present disclosure, and implementations of the present disclosure are not limited thereto.

It should also be understood that when the terminal device in an implementation of the present disclosure determines the first transmission power, it may be determined in combination with the implementation mode of one or more implementations described above, and this is not restricted in implementations of the present disclosure.

Figure 3:
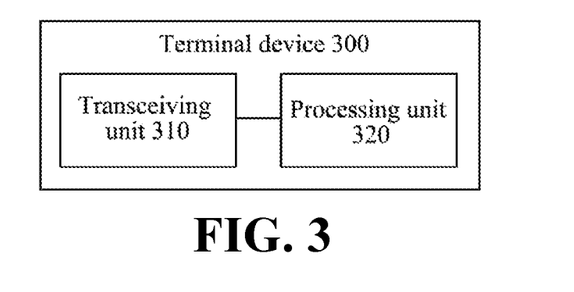
FIG. 3 is a schematic block diagram of a terminal device according to an implementation of the present disclosure.

FIG. 3 is a schematic block diagram of a terminal device 300 according to an implementation of the present disclosure.

As shown in FIG. 3, a terminal device 300 includes a transceiving unit 30 and a processing unit 320.

The transceiving unit 310 is configured to receive a first offset value sent by a network device.

The processing unit 320 is configured to determine a first transmission power of uplink data of the terminal device according to the first offset value, wherein the first transmission power is less than or equal to a second transmission power, and the second transmission power is a transmission power determined by the terminal device according to an anti-interference ability of the terminal device.

The transceiving unit 310 is further configured to transmit the uplink data to the network device according to the first transmission power.

Optionally, the first offset value is a power offset value determined by the network device according to the second offset value, the second offset value is an offset value between the second transmission power and a third transmission power, and the third transmission power is a current transmission power of the terminal device.

Optionally, the transceiving unit 310 is further configured to: send the second offset value to the network device before the first offset value sent by the network device is received.

Optionally, the second offset value is carried on a media access control (MAC) control element (CE).

Optionally, the transceiving unit 310 is specifically configured to: send the second offset value to the network device periodically; or, send the second offset value to the network device only once; or, send the second offset value to the network device when it is determined that a reporting condition is satisfied, wherein the reporting condition is used for triggering the terminal device to send the second offset value to the network device.

Optionally, the transceiving unit 310 is more specifically configured to: send the second offset value to the network device when the second offset value is greater than or equal to a reporting threshold.

Optionally, the first offset value is a power offset value determined by the network device according to a third offset value, the third offset value is sent to the network device by the terminal device, the third offset value is an offset value between a third transmission power and a fourth transmission power, the third transmission power is the current transmission power of the terminal device, and the fourth transmission power is a maximum transmission power which may be supported by the terminal device.

Optionally, the processing unit 320 is specifically configured to: determine a fifth transmission power according to the first offset value and the third transmission power; and determine the first transmission power by comparing the second transmission power with the fifth transmission power.

Optionally, the processing unit 320 is specifically configured to: determine the fifth transmission power as the first transmission power when the fifth transmission power is less than the second transmission power; or, determine the second transmission power as the first transmission power when the fifth transmission power is greater than or equal to the second transmission power.

Optionally, the transceiving unit 310 is further configured to: send an early warning indication to the network device before the first offset value sent by the network device is received, the early warning indication is used for providing an early warning of an offset degree between the second transmission power and a third transmission power to the network device, and the third transmission power is a current transmission power of the terminal device.

Optionally, the transceiving unit 310 is specifically configured to: send the early warning indication to the network device when it is determined that an offset value between the second transmission power and the third transmission power is less than or equal to a reporting threshold.

Optionally, the processing unit 320 is further configured to: determine the second transmission power according to the anti-interference ability of the terminal device before the first offset value sent by the network device is received.

Figure 4:
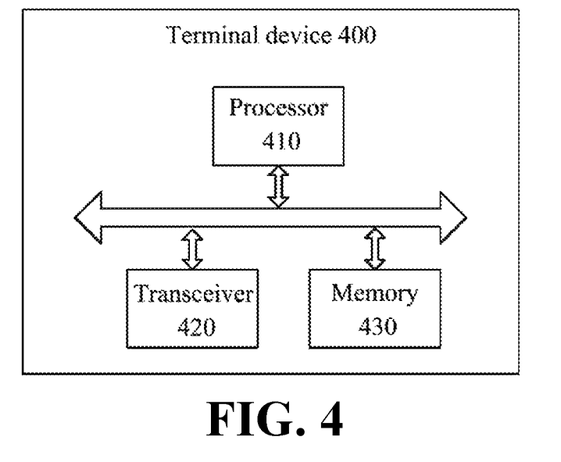
FIG. 4 is another schematic block diagram of a terminal device according to another implementation of the present disclosure.

It should be noted that, the transceiving unit 310 may be implemented by a transceiver, and the processing unit 320 may be implemented by a processor. As shown in FIG. 4, a terminal device 400 may include a processor 410, a transceiver 420, and a memory 430. The memory 430 may be used for storing indication information, or may be used for storing codes, instructions, etc., executed by the processor 410. The various components in the terminal device 400 are connected by a bus system. The bus system includes a power bus, a control bus and a status signal bus in addition to a data bus.

A terminal device 400 shown in FIG. 4 may implement various processes implemented by the terminal device in the method implementation of FIG. 2 described above, and the details will not be described here to avoid repetition.

Figure 5:
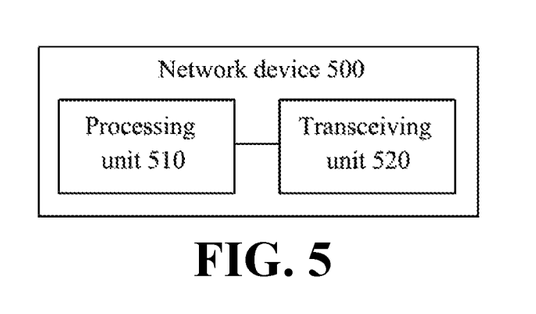
FIG. 5 is a schematic block diagram of a network device according to an implementation of the present disclosure.

FIG. 5 is a schematic diagram of a network device 500 according to an implementation of the present disclosure.

As shown in FIG. 5, the network device 500 includes a processing unit 510 and a transceiving unit 520.

The processing unit 510 is configured to determine a first offset value.

The transceiving unit 520 is configured to send the first offset value to a terminal device to enable the terminal device to determine a first transmission power of uplink data of the terminal device according to the first offset value, the first transmission power is less than or equal to a second transmission power, and the second transmission power is a transmission power determined by the terminal device according to an anti-interference ability of the terminal device.

Optionally, the transceiving unit 520 is further configured to: receive a second offset value sent by the terminal device before the first offset value is determined, wherein the second offset value is an offset value between the second transmission power and a third transmission power, and the third transmission power is a current transmission power of the terminal device. Wherein, the processing unit 510 is configured to: determine the first offset value according to the second offset value.

Optionally, the second offset value is carried on a media access control (MAC) control element (CE).

Optionally, the transceiving unit 520 is specifically configured to: receive the second offset value sent by the terminal device periodically; or, receive the second offset value sent by the terminal device only once.

Optionally, the transceiving unit 520 is further configured to: receive a third offset value sent by the terminal device before the first offset value is determined, wherein the third offset value is an offset value between the third transmission power and a fourth transmission power, the third transmission power is a current transmission power of the terminal device, and the fourth transmission power is a maximum transmission power which may be supported by the terminal device. Wherein, the processing unit 510 is configured to: determine the first offset value according to the third offset value.

Optionally, the transceiving unit 520 is further configured to: receive an early warning indication sent by the terminal device before the first offset value is determined, wherein the early warning indication is used for providing an early warning of an offset degree between the second transmission power and a third transmission power to the network device, and the third transmission power is a current transmission power of the terminal device.

Figure 6:
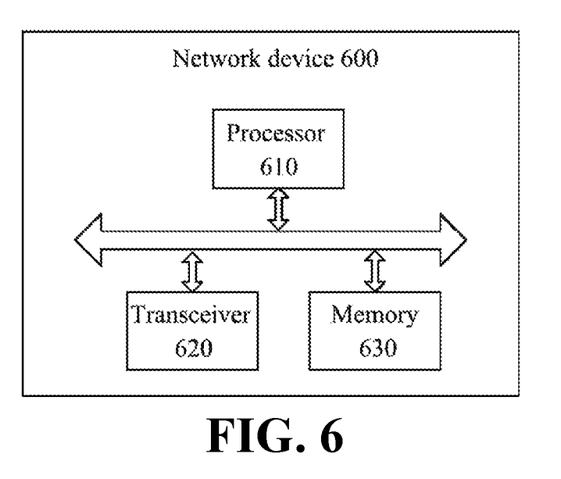
FIG. 6 is another schematic block diagram of a network device according to an implementation of the present disclosure.

It should be noted that the processing unit 510 may be implemented by a processor, and the transceiving unit 520 may be implemented by a transceiver. As shown in FIG. 6, a network device 600 may include a processor 610, a transceiver 620, and a memory 630. The memory 630 may be used for storing indication information, or may be used for storing codes, instructions, etc., executed by the processor 610. Various components in the network device 600 are connected by a bus system. The bus system includes a power bus, a control bus and a status signal bus in addition to a data bus.

The network device 600 shown in FIG. 6 may implement various processes implemented by the network device in the method implementation of FIG. 2 described above, and the details will not be described here to avoid repetition. It should be noted that the method implementations in implementations of the present disclosure may be applied to a processor or implemented by a processor.

In the implementation process, each act of the method implementations in the implementations of the present disclosure may be completed by an integrated logic circuit of hardware in the processor or an instruction in a form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and completes the acts of the above method in combination with its hardware.

The processor may be an integrated circuit chip with a ability for processing signals, and may implement or execute various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or another programmable logic device, a transistor logic device, or a discrete hardware component, or the like. Furthermore, the general purpose processor may be a microprocessor or the processor may be any conventional processor or the like.

In addition, in an implementation of the present disclosure, the memory may be a volatile memory or non-volatile memory, or may include both the volatile memory and the non-volatile memory. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. It should be understood that, the foregoing memory is an example for illustration and should not be construed as limiting. For example, optionally, the memory in an implementation of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synch link DRAM (SLDRAM), Direct Rambus RAM (DR RAM), or the like. That is, memories in the systems and methods described here are intended to include, but are not limited to, these and any other suitable types of memories.

Finally, it should be noted that the terms used in the implementations of the present disclosure and the appended claims are for the purpose of describing specific implementations only, but are not intended to limit the implementations of the present disclosure.

For example, singular forms "a", "said", and "the" used in the implementations of the present disclosure and the appended claims are also intended to include the plural forms unless the context clearly indicates other meanings.

For another example, the terms, the first terminal device, the second terminal device, may be used in the implementations of the present disclosure, but these terminal devices should not be limited to these terms. These terms are only used to distinguish type cell groups from each other.

For another example, depending on the context, the word "when" as used here may be interpreted as "if" or "whether" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that various example units and algorithm acts described in connection with the implementations disclosed here can be implemented in electronic hardware, or a combination of computer software and electronic hardware. Whether these functions are implemented in hardware or software depends on a specific application and design constraint of a technical solution. One skilled in the art may use different methods to realize the described functions for each particular application, but such realization should not be considered to be beyond the scope of implementations of the present disclosure.

Those skilled in the art may clearly understand that for convenience and conciseness of description, specific working processes of the systems, apparatuses and units described above may refer to corresponding processes in the aforementioned method implementations, and details are not described here again.

In several implementations provided by the present disclosure, it should be understood that the disclosed systems, devices and methods may be implemented in other ways. For example, the device implementations described above are only illustrative. For example, the division of the units is only a logical function division, and there may be other division modes in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

What are described above are merely the specific implementation modes of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the protection scope of the

What is claim is:

1. A method for transmitting data, comprising:
   receiving, by a terminal device, a first offset value sent by a network device;
   determining, by the terminal device, a first transmission power of uplink data of the terminal device according to the first offset value, wherein the first transmission power is less than or equal to a second transmission power, and the second transmission power is a transmission power determined by the terminal device according to an anti-interference ability of the terminal device; and
   transmitting, by the terminal device, the uplink data to the network device according to the first transmission power,
   wherein the first offset value is a power offset value determined by the network device according to a second offset value, the second offset value is an offset value between the second transmission power and a third transmission power, and the third transmission power is a current transmission power of the terminal device.

2. The method of claim 1, wherein the method further comprises:
   before the terminal device receives the first offset value sent by the network device, sending, by the terminal device, the second offset value to the network device, wherein the second offset value is carried on a media access control (MAC) control element (CE).

3. The method of claim 2, wherein sending, by the terminal device, the second offset value to the network device, comprises:
   sending, by the terminal device, the second offset value to the network device periodically; or,
   sending, by the terminal device, the second offset value to the network device only once; or,
   sending, by the terminal device, the second offset value to the network device when the terminal device determines that a reporting condition is satisfied, wherein the reporting condition is used for triggering the terminal device to send the second offset value to the network device,
   wherein sending, by the terminal device, the second offset value to the network device when the terminal device determines that the reporting condition is satisfied, comprises:
   sending, by the terminal device, the second offset value to the network device when the second offset value is greater than or equal to a reporting threshold.

4. The method of claim 1, wherein the method further comprises:
   before the terminal device receives the first offset value sent by the network device, sending, by the terminal device, an early warning indication to the network device, wherein the early warning indication is used for providing an early warning of an offset degree between the second transmission power and a third transmission power to the network device, and the third transmission power is a current transmission power of the terminal device,
   wherein sending, by the terminal device, the early warning indication to the network device, comprises:
   sending, by the terminal device, the early warning indication to the network device when the terminal device determines that an offset value between the second transmission power and the third transmission power is less than or equal to a reporting threshold.

5. The method of claim 1, wherein the method further comprises:
   before the terminal device receives the first offset value sent by the network device, determining, by the terminal device, the second transmission power according to the anti-interference ability of the terminal device.

6. A terminal device, comprising:
   a transceiver, configured to receive a first offset value sent by a network device; and
   a processor, configured to determine a first transmission power of uplink data of the terminal device according to the first offset value, wherein the first transmission power is less than or equal to a second transmission power, and the second transmission power is a transmission power determined by the terminal device according to an anti-interference ability of the terminal device;
   the transceiver is further configured to transmit the uplink data to the network device according to the first transmission power,
   wherein the first offset value is a power offset value determined by the network device according to a second offset value, the second offset value is an offset value between the second transmission power and a third transmission power, and the third transmission power is a current transmission power of the terminal device.

7. The terminal device of claim 6, wherein the transceiver is further configured to:
   send the second offset value to the network device before the first offset value sent by the network device is received.

8. The terminal device of claim 7, wherein the second offset value is carried on a media access control (MAC) control element (CE).

9. The terminal device of claim 7, wherein the transceiver is specifically configured to:
   send the second offset value to the network device periodically; or,
   send the second offset value to the network device only once; or,
   send the second offset value to the network device when it is determined that a report condition is satisfied, wherein the report condition is used for triggering the terminal device to send the second offset value to the network device.

10. The terminal device of claim 9, wherein the transceiver is specifically configured to:
    send the second offset value to the network device when the second offset value is greater than or equal to a reporting threshold.

11. The terminal device of claim 6, wherein the transceiver is further configured to:
    send an early warning indication to the network device before the first offset value sent by the network device is received, wherein the early warning indication is used for providing an early warning of an offset degree between the second transmission power and a third transmission power to the network device, and the third transmission power is a current transmission power of the terminal device.

12. The terminal device of claim 11, wherein the transceiver is specifically configured to:
    send the early warning indication to the network device when it is determined that an offset value between the second transmission power and the third transmission power is less than or equal to a reporting threshold.

13. The terminal device of claim 6, wherein the processor is specifically configured to:
determine the second transmission power according to the anti-interference ability of the terminal device before the first offset value sent by the network device is received.

* * * * *